(12) United States Patent
Ahmed

(10) Patent No.: US 12,309,607 B2
(45) Date of Patent: May 20, 2025

(54) NETWORK NODE AND METHOD FOR HANDLING A MULTICASE-BROADCAST SINGLE-FREQUENCY NETWORK (MBSFN) SUBFRAME CONFIGURATION IN A WIRELESS COMMUNICATIONS NETWORK

(71) Applicant: Telefonaktiebolaget LM Ericsson (publ), Stockholm (SE)

(72) Inventor: Saad Naveed Ahmed, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 195 days.

(21) Appl. No.: 17/909,097

(22) PCT Filed: May 7, 2020

(86) PCT No.: PCT/SE2020/050473
§ 371 (c)(1),
(2) Date: Sep. 2, 2022

(87) PCT Pub. No.: WO2021/225484
PCT Pub. Date: Nov. 11, 2021

(65) Prior Publication Data
US 2024/0040390 A1    Feb. 1, 2024

(51) Int. Cl.
*H04W 16/14* (2009.01)
*H04W 72/30* (2023.01)
*H04W 72/52* (2023.01)

(52) U.S. Cl.
CPC ........... *H04W 16/14* (2013.01); *H04W 72/30* (2023.01); *H04W 72/52* (2023.01)

(58) Field of Classification Search
CPC ...... H04W 16/14; H04W 72/30; H04W 72/52
(Continued)

(56) References Cited

U.S. PATENT DOCUMENTS

| 2011/0103286 A1 | 5/2011 | Montojo et al. |
| 2015/0049689 A1 | 2/2015 | Seo |

(Continued)

FOREIGN PATENT DOCUMENTS

| CN | 102577520 A | 7/2012 |
| CN | 104871617 A | 8/2015 |

(Continued)

OTHER PUBLICATIONS

"5G NR and 4G LTE Coexistence", A Comprehensive Deployment Guide to Dynamic Spectrum Sharing, Mediatek, White Paper,, Mar. 3, 2020, pp. 1-30.

(Continued)

*Primary Examiner* — Chi Tang P Cheng
(74) *Attorney, Agent, or Firm* — Murphy, Bilak & Homiller, PLLC

(57) ABSTRACT

A network node for handling a Multicast-Broadcast Single-Frequency Network (MBSFN) subframe configuration in a wireless communications network is provided. The MBSFN subframe configuration is configured for a first Radio Access technology (RAT) for operating in shared spectrum mode with a second RAT for radio communication with one or more User Equipments (UEs). The MBSFN subframe configuration is configured with a second RAT Cell-Specific Reference Signal (CRS) rate matching. For the MBSFN subframe configuration and for a number of past subframes, the network node obtains (401) a first requirement of subframes related to the first RAT. The first requirement is based on load and radio conditions related to the first RAT. For the MBSFN subframe configuration and for a number of past subframes, the network node obtains (402) a second requirement of subframes related to the second RAT. The second requirement is based on load and radio conditions related to the second RAT. The network node then decides (403)

(Continued)

whether or not to change the MBSFN subframe configuration, based on the first requirement of subframes and the second requirement of subframes related to the second RAT. The econd requirement is based on load and ratio conditions related to the second RAT. The network node then decides (403) whether or not to change the MBSFN subframe configuration, based on the first requirement of subframes and the second reequirement of subframes.

14 Claims, 13 Drawing Sheets

(58) Field of Classification Search
USPC .......................................................... 370/329
See application file for complete search history.

(56) References Cited

U.S. PATENT DOCUMENTS

| 2015/0334600 A1 | 11/2015 | Hurd et al. |
| 2017/0099667 A1 | 4/2017 | Dinan |
| 2018/0070369 A1 | 3/2018 | Papasakellariou |
| 2019/0141538 A1* | 5/2019 | Jones ..................... H04W 72/30 |
| 2020/0053758 A1 | 2/2020 | Hosseini et al. |
| 2020/0351987 A1* | 11/2020 | Gheorghiu ............ H04W 24/10 |

FOREIGN PATENT DOCUMENTS

| EP | 3457590 A1 | 3/2019 |
| WO | 2013112983 A2 | 8/2013 |
| WO | 2013112983 A3 | 8/2013 |
| WO | 2013112983 A8 | 8/2013 |
| WO | 2019005797 A1 | 1/2019 |
| WO | 2019090354 A1 | 5/2019 |

OTHER PUBLICATIONS

"Summary of Email discussion [69#31] LTE: Relay configuration at startup / subframe reconfiguration", 3GPP TSG-RAN WG2 Meeting #69_bis, R2-102085, Beijing, China, Apr. 12-16, 2010, pp. 1-9.
"Views on dynamic spectrum sharing between LTE band 48 and NR band n48", 3GPP RAN WG4 Meeting #94-e, R4-2002048, Online, Feb. 24-Mar. 6, 2020, pp. 1-5.
Liu, Yue-Xi, "Reconstruct MBSFN subframes to improve spectrum efficiency at low penetration rates of R9/10 terminals", doi: 10.3969; issn. 1672-9528, Dec. 19, 2019, pp. 1-4.

* cited by examiner

401. Obtain for a number of past subframes, 1st requirement of subframes related to 1st RAT, based on load and radio conditions related to 1st RAT.

401-1. For each subframe, calculate 1st current downlink throughput.

401-2. For each subframe, calculate 1st potential downlink throughput.

401-3. For each subframe, update a 1st unused subframe counter.

401-4. Compute a 1st difference between the 1st current downlink throughput and the 1st potential downlink throughput.

402. Obtain for the number of past subframes, 2nd requirement of subframes related to 2nd RAT, based on load and radio conditions related to 2nd RAT.

402-1. For each subframe, calculate 2nd current downlink throughput.

402-2. For each subframe, calculate 2nd potential downlink throughput.

402-3. For each subframe, update a 2nd unused subframe counter.

402-4. Compute a 2nd difference between the 2nd current downlink throughput and the 2nd potential downlink throughput.

403. Decide whether or not to change the MBSFN subframe configuration, based on the 1st requirement of subframes and the 2nd requirement of subframes.

Fig. 4

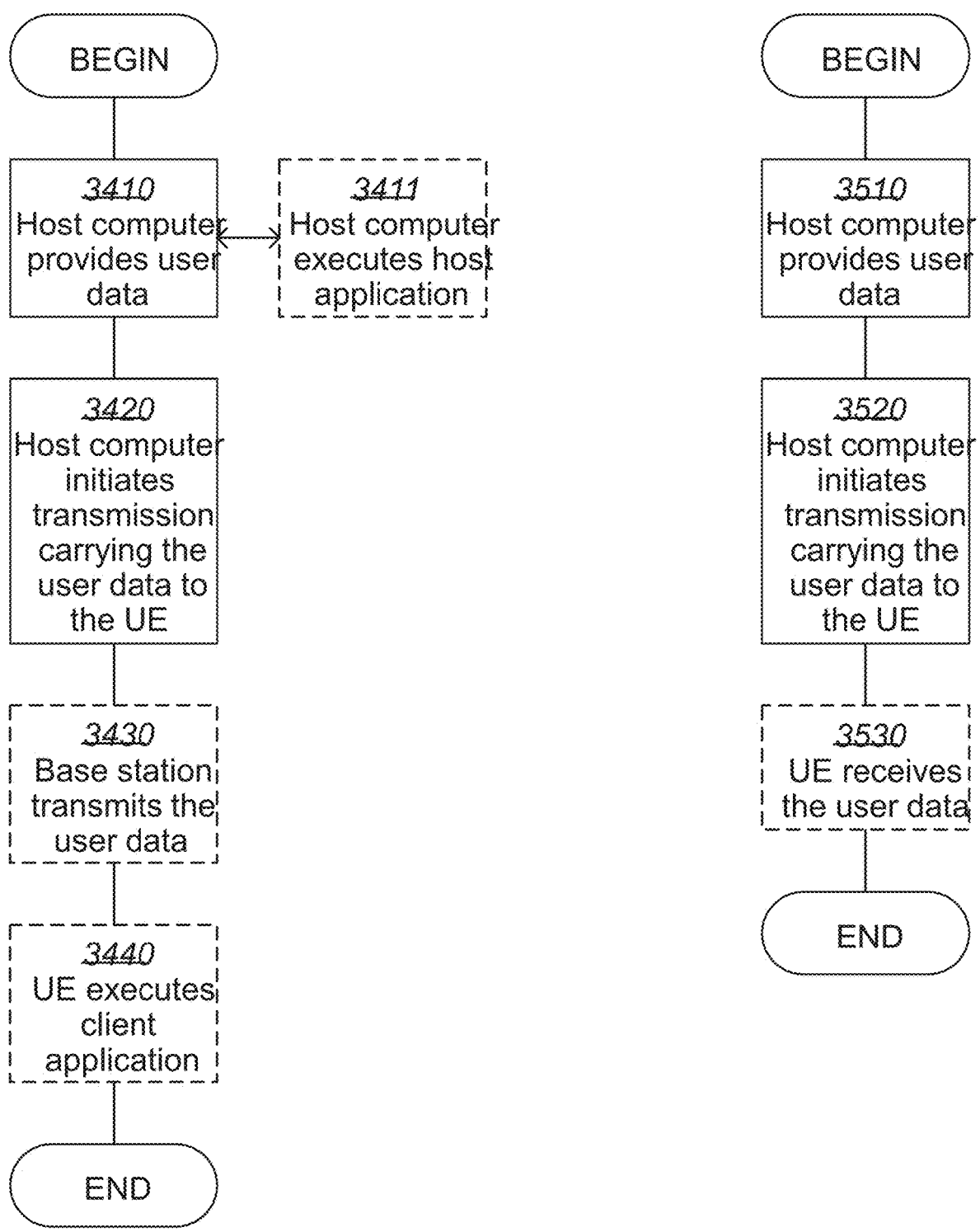

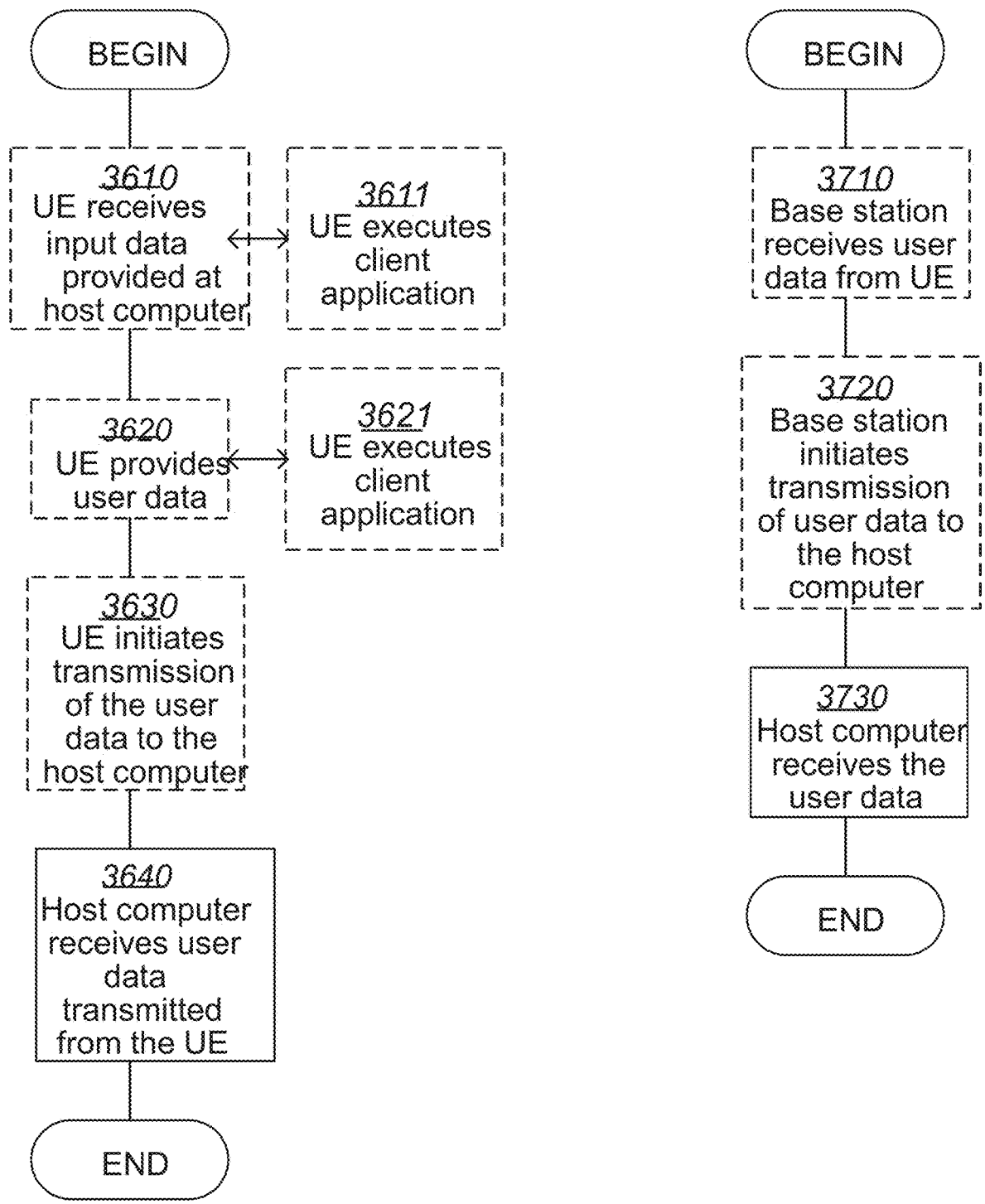

NETWORK NODE AND METHOD FOR HANDLING A MULTICASE-BROADCAST SINGLE-FREQUENCY NETWORK (MBSFN) SUBFRAME CONFIGURATION IN A WIRELESS COMMUNICATIONS NETWORK

TECHNICAL FIELD

Embodiments herein relate to a network node and methods therein. In some aspects, they relate to handling a Multicast-Broadcast Single-Frequency Network (MBSFN) subframe configuration in a wireless communications network.

Embodiments herein further relates to computer programs and carriers corresponding to the above methods and network nodes.

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.
Spectrum Sharing:

5G will be introduced on both new and legacy spectrum bands. This requires functionality that enables operators to plan its evolution of network assets including both spectrum bands and technologies, as well as, allow for a seamless roll-out of 5G with optimal end-user performance. A Dynamic Spectrum Sharing (DSS) solution referred to as Ericsson Spectrum Sharing (ESS) may give the possibility to intelligently, flexibly and quickly introduce and add 5G within existing 4G carriers, e.g. introduce 5G on low/mid bands for wide area coverage and outside in coverage. ESS software may dynamically share spectrum between 4G and 5G carriers based on traffic demand. The switch between carriers happens within milliseconds, which minimizes spectrum wastage and allows for best end-user performance. FIG. 1 depicts LTE and NR sharing a spectrum in time and frequency, wherein the LTE part of the carriers is represented by white staples in the bottom of the figure, and the NR part of the carriers is represented by black staples in the top of the figure.

FIG. 2 shows LTE Cell specific Reference Signals (CRS). It can be seen that the PRB grid in LTE is always occupied by CRS around which NR user has to rate match.
Role of MBSFN Subframe In ESS, a Synchronization Signal Block (SSB) is transmitted in an LTE Multicast-Broadcast Single-Frequency Network (MBSFN) subframe. The MBSFN subframe contains fewer LTE reference signals than a normal LTE subframe. and thereby avoids collisions with the NR SSB. This is since MBSFN subframe has different structure from the normal (non-MBSFN) subframe. The first one or two OFDM Symbol in MBSFN subframe is allocated for control region as in normal subframe, however, location of Reference Signal for MBSFN is different from Non-MBSFN Reference Signal.

In ESS, MBSFN subframes are also used to convey other periodic NR signals, such as system information. ESS benefits from those periodic NR broadcast signals being sparse, so that only a few MBSFN subframes are required for making spectrum sharing possible.

Some MBSFN subframes are introduced to protect some configured NR signals such as Tracking Reference Signal (TRS) and Channel state information reference signal (CSI-RS), thereby collisions with LTE reference signals are avoided. This is since, data region of MBSFN subframes can be void of Reference Signals. In this context, it should be noted that the ESS itself does not add overhead. The reference and control signals are just the ones that LTE and NR require.

To summarize, in ESS there are two types of subframes for ESS: Cell Specific Reference Signals (CRS) rate matching (also referred to as Non-MBSFN) subframes and MBSFN subframes.
LTE CRS Rate Matching To avoid the LTE CRS resource elements (RE), a 5G-NR UE is configured with the LTE CRS RE information so that the NR UE can calculate the LTE CRS REs as reserved resources. The 5G-NR UE will rate match PDSCH around those reserved resources, referred to as LTE CRS rate matching.

To match a rate in this context means to regard certain resource elements as unavailable for PDSCH.

An NR device, such as an NR UE, that is configured with LTE CRS rate matching is aware of the resource elements in the time-frequency grid of the shared spectrum carrying LTE cell-specific reference signals (CRS) and it does not decode NR data on these resource elements. CRS rate matching is available for an NR data channel when using 15 kHz subcarrier spacing with both Frequency Division Duplex (FDD) and Time Division Duplex (TDD).

A disadvantage for NR PDSCH due to LTE CRS rate matching is that the number of usable Resource Elements (REs) per Physical Resource Block (PRB) is reduced. A further disadvantage for NR PDSCH due to LTE CRS rate matching is that the maximum usable Modulation and Coding Schemes (MCS)s for NR in the above mentioned CRS rate matching (Non-MBSFN) subframe gets restricted. These disadvantages will be further described below.

SUMMARY

An object of embodiments herein is to improve the performance in a multi Radio Access Technology (RAT) communications network using Spectrum Sharing.]

According to an aspect, the object is achieved by a method performed by a network node for handling a Multicast-Broadcast Single-Frequency Network, MBSFN, subframe configuration in a wireless communications network. The MBSFN subframe configuration is configured for a first Radio Access technology, RAT, for operating in shared spectrum mode with a second RAT for radio communication with one or more User Equipments, UEs. The MBSFN subframe configuration is configured with a second RAT Cell-Specific Reference Signal, CRS, rate matching.

For the MBSFN subframe configuration and for a number of past subframes, the network node obtains a first requirement of subframes related to the first RAT. The first requirement is based on load and radio conditions related to the first RAT. For the MBSFN subframe configuration and for a number of past subframes, the network node obtains a second requirement of subframes related to the second RAT. The second requirement is based on load and radio conditions related to the second RAT.

The network node then decides whether or not to change the MBSFN subframe configuration, based on the first requirement of subframes and the second requirement of subframes.

According to another aspect, the object is achieved by a network node configured to handle a Multicast-Broadcast Single-Frequency Network, MBSFN, subframe configuration in a wireless communications network. The MBSFN subframe configuration is adapted to be configured for a first Radio Access technology, RAT, for operating in shared spectrum mode with a second RAT for radio communication with one or more User Equipments, UE. The MBSFN subframe configuration is adapted to be configured with a second RAT Cell-Specific Reference Signal, CRS, rate matching. The network node is further configured to, for the MBSFN subframe configuration: For a number of past subframes, obtain a first requirement of subframes related to the first RAT, which first requirement is adapted to be based on load and radio conditions related to the first RAT, and for the number of past subframes, obtain a second requirement of subframes related to the second RAT, which second requirement is adapted to be based on load and radio conditions related to the second RAT. The network node is further configured to decide whether or not to change the MBSFN subframe configuration based on the first requirement of subframes and the second requirement of subframes.

Embodiments herein provide a method to increase efficiency of radio resources in time domain in shared spectrum RAT system considering the load requirements of each respective first RAT and second RAT. By deciding whether or not to change the MBSFN subframe configuration based on the first requirement of subframes and the second requirement of subframes, an improved utilization of a radio channel is achieved. This in turn results in an improved performance in a multi RAT communications network using Spectrum Sharing.

Advantages of embodiments herein at least comprises:
An improved utilization of a radio channel.
An adaption to traffic requirements of spectrum sharing RATs.

BRIEF DESCRIPTION OF THE DRAWINGS

FIG. 4 is a flow chart depicting embodiments of a method in a network node.

FIGS. 12 to 15 are flowcharts illustrating methods implemented in a communication system including a host computer, a base station and a user equipment.

DETAILED DESCRIPTION

As a part of developing embodiments herein the inventors identified a problem which first will be discussed.

As mentioned above, some disadvantages for NR PDSCH due to LTE CRS rate matching are that the number of usable REs per PRB is reduced, and that the maximum usable MCSs for NR in a CRS rate matching (Non-MBSFN) subframe gets restricted.

The number of usable Resource Elements (REs) per Physical Resource Block (PRB) is reduced depending. The reduction depends on the number of CRS antenna ports of a network node. Up to 16 REs out of 132 (11 usable symbols for NR-PDSCH with ESS×12 subcarriers) for 4 port CRS become unusable i.e. 12% (16/132) reduction happens to NR peak throughput due to rate matching with LTE CRS.

The maximum usable Modulation and Coding Schemes (MCS)s for NR in such subframe gets restricted to 24 for 2 CRS ports and 23 for 4 CRS ports. This lower MCS is artefact that lesser REs are available and that code rate, ratio of REs for Data to Total number of Res, cannot exceed 3GPP defined limit. From 3GPP 38.214, the UE may skip decoding a transport block in an initial transmission if the effective channel code rate is higher than 0.95, where the effective channel code rate is defined as the number of downlink information bits (including CRC bits) divided by the number of physical channel bits on PDSCH. This incurs a significant additional loss of available REs as the remaining REs cannot be utilized with full efficiency. See Table 1 showing 3GPP Table 5.1.3.1-2 as shown below.

| MCS Index $I_{MCS}$ | Modulation Order $Q_m$ | Target code Rate Rx [1024] | Spectral efficiency | % Difference from MCS27 |
|---|---|---|---|---|
| 23 | 8 | 797 | 6.2266 | 11.3 |
| 24 | 8 | 841 | 6.5703 | 16 |
| 27 | 8 | 948 | 7.4063 | |

Table 1 showing 3GPP Table 5.1.3.1-2: MCS index table 2 for PDSCH

These disadvantages motivate to explore schemes for NR where such losses can be eliminated or minimized in spectrum sharing mode.

Thus, an object of embodiments herein is to improve the performance in a multi RAT communications network using spectrum sharing.

Embodiments herein handling a Multicast-Broadcast Single-Frequency Network, MBSFN dynamic MBSFN configuration in Spectrum Sharing RATs.

Embodiments herein provide a method to minimize the above-mentioned problems e.g. faced by NR-ESS due to LTE-CRS rate matching when operating in shared spectrum mode with LTE. An example of the method e.g. considers the load and radio conditions of the respective RAT to adapt a MBSFN subframe configuration most suitable for the overall wireless communications network.

Embodiments herein provide a method to increase efficiency of radio resources in time domain in shared spectrum RAT system considering the load requirements of each respective RAT.

Advantages of embodiments herein at least comprises:
An improved utilization of a radio channel.
An adaption to traffic requirements of spectrum sharing RATs.

Figure 1:
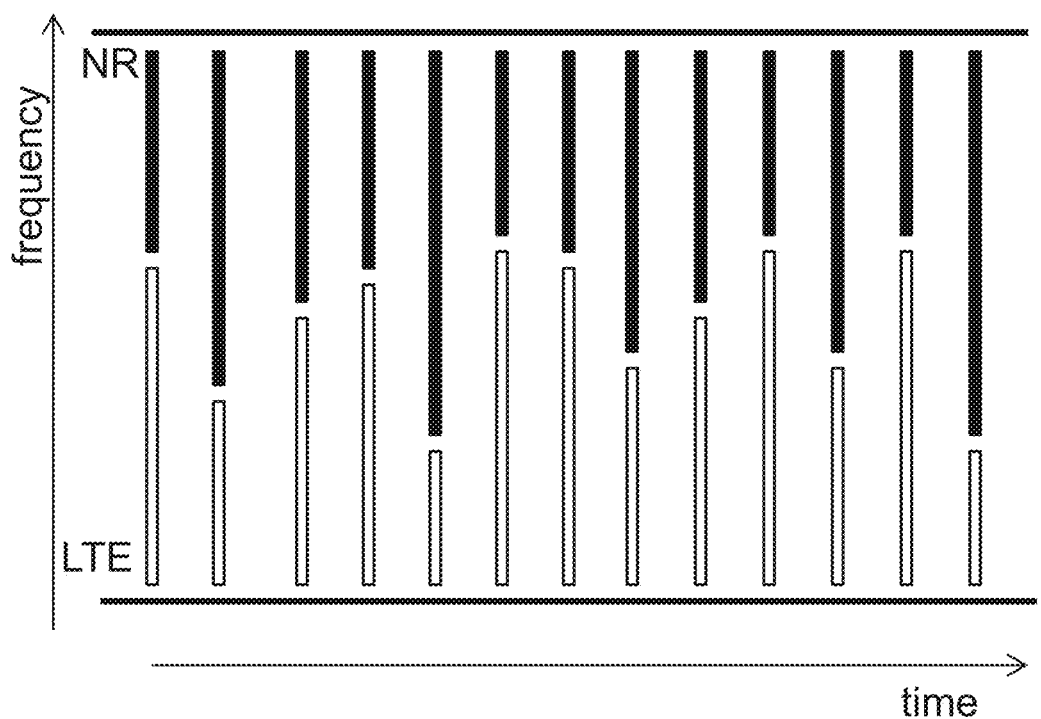
FIG. 1 is a schematic block diagram depicting an example of prior art.
Figure 2:
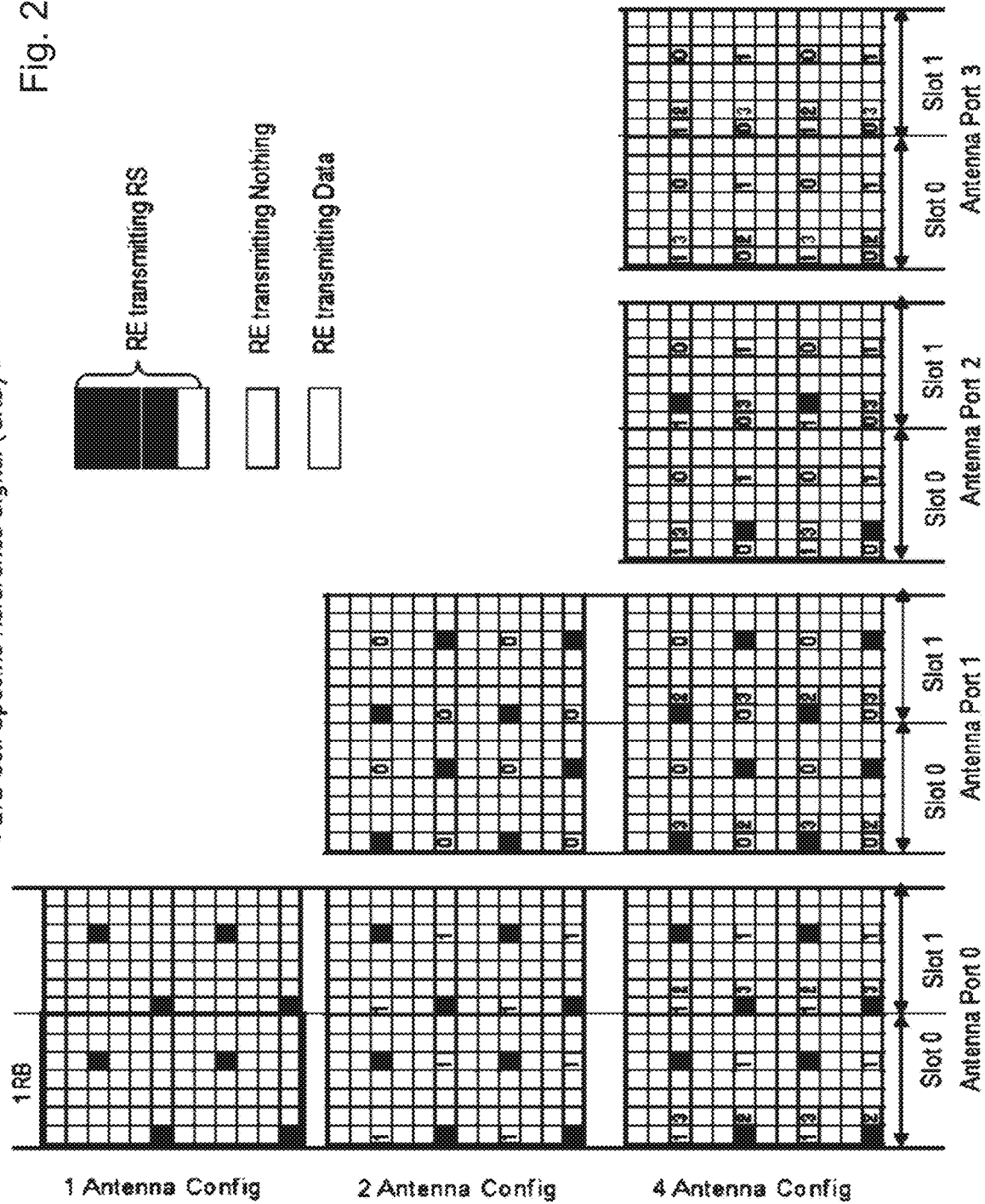
FIG. 2 is a schematic block diagram depicting an example of prior art.
Figure 3:
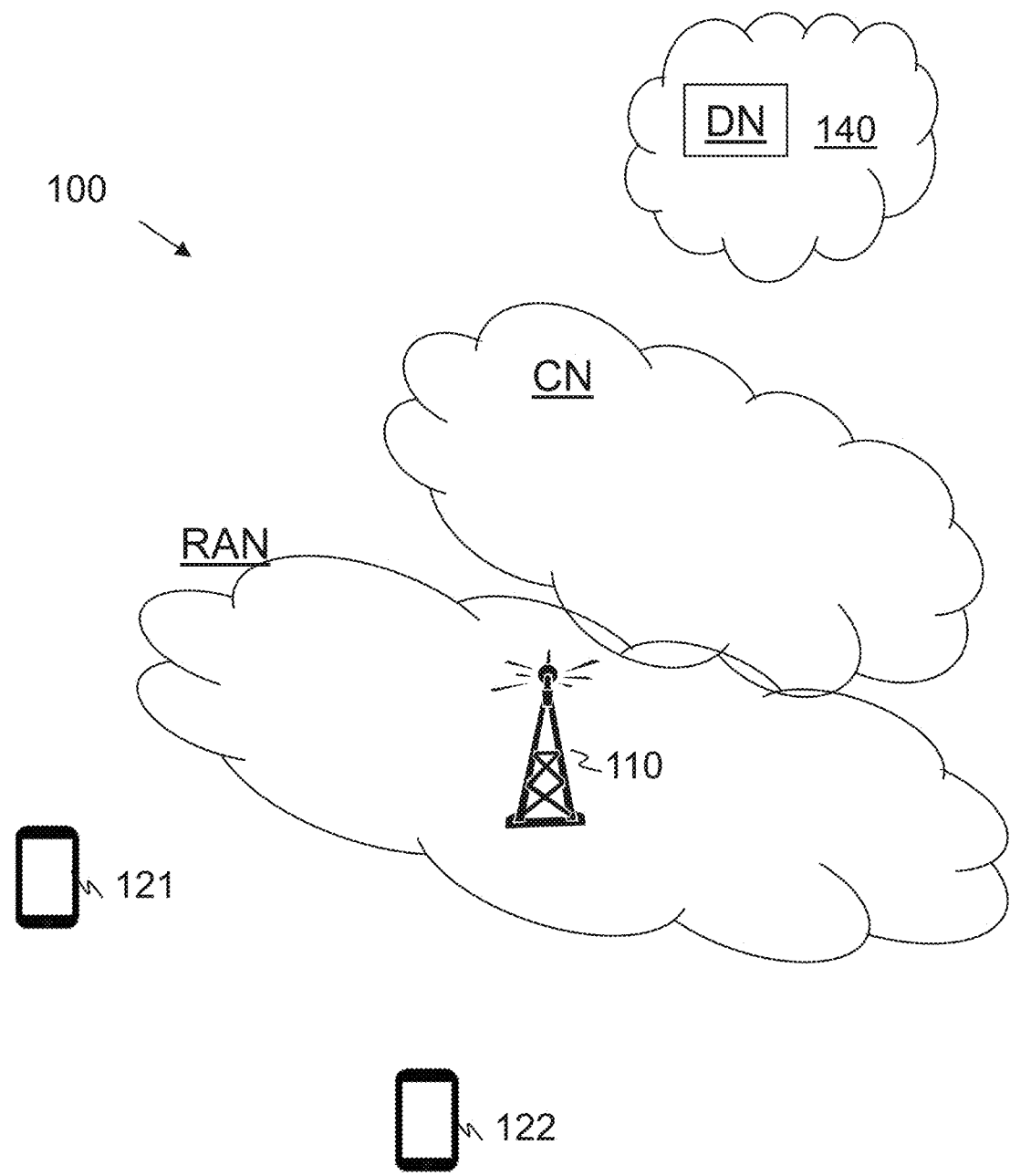
FIG. 3 is a schematic block diagram depicting embodiments of a wireless communication network.

FIG. 3 is a schematic overview depicting a wireless communications network 100 wherein embodiments herein may be implemented. The wireless communications network 100 comprises one or more RANs and one or more CNs. The wireless communications network 100 may use 5 Fifth Generation New Radio, (5G NR) but may further use a number of other different Radio Access Technologies (RAT)s, such as, WiFi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. According to some embodiments herein, a first RAT may e.g. be any one out of LTE or NR. A second RAT may e.g. be LTE if the first RAT is NR or NR if the first RAT is LTE.

Network nodes such as a network node 110, also referred to as the network node 110, operates in the wireless communications network 100. The network node 110 provides radio access in one or more cells by means of antenna beams. This means that the network node 110 provides radio coverage over a geographical area by means of its antenna beams. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by network node 110 depending e.g. on the radio access technology and terminology used.

Wireless devices such as UEs 121, 122 operate in the wireless communications network 100. The respective UE 121, 122 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more CNs. It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may be performed by the network node 110. As an alternative, a Distributed Node (DN) and functionality, e.g. comprised in a cloud 140 as shown in FIG. 3, may be used for performing or partly performing the methods.

FIG. 4 shows example embodiments of a method performed by the network node 110 for handling an MBSFN subframe configuration in a wireless communications network 100. The MBSFN subframe configuration is configured for a first RAT, e.g. NR, for operating in shared spectrum mode with a second RAT, e.g. LTE, for radio communication with one or more UEs 121, 122. See also FIG. 6.

The first RAT may be represented by Fifth Generation New Radio (5G NR) also referred to as NR herein, and the second RAT may be represented by Fourth Generation Long Term Evolution, 4G LTE, or the first RAT may be represented by 4G LTE and the second RAT may be represented by 5G NR.

The MBSFN subframe configuration is configured with a second RAT CRS rate matching. This may also be referred to as a second RAT CRS rate matching for the first RAT, for example, an LTE CRS rate matching for NR.

This means that a first RAT UE, such as the UE 121, configured with second RAT CRS rate matching, is aware of resource elements in the time-frequency grid that carry second RAT CRS and consequently, the first RAT UE does not decode first RAT data on these resource elements.

For example, an NR UE, such as the UE 121, configured with LTE CRS rate matching, is aware of resource elements in the time-frequency grid that carry LTE CRS and consequently, the NR UE does not decode NR data on these resource elements.

The method comprises one or more of the following actions, which actions may be taken in any suitable order. Actions that are optional are marked with dashed boxes in the figure.

Action 401

This action is performed for the MBSFN subframe configuration, also referred to herein as the current MBSFN subframe configuration.

For a number of past subframes, the network node 110 obtains a first requirement of subframes related to the first RAT. The first requirement is based on load and radio conditions related to the first RAT.

The first requirement of subframes related to the first RAT may comprise any one out of increase, decrease, or no change of, the number of subframes related to the first RAT.

In some embodiments, the obtaining of the first requirement of subframes related to the first RAT is performed according to the following actions 401-1, 401-2, and 401-4, and possibly action 402-3.

Action 401-1. For each subframe out of the number of past subframes, the network node 110 calculates a first current downlink throughput, based on load and radio conditions and subframe restrictions related to the first RAT.

Action 401-2. For each subframe out of the number of past subframes the network node 110 calculates a first potential downlink throughput, based on the load and radio conditions related to the first RAT while disregarding subframe restrictions related to the first RAT.

The potential downlink throughput represents opportunities to schedule which as an example may be in first 5 subframes out of 10. The Current downlink throughput represents the throughput utilized as a result of the MBSFN subframe configuration. The RAT's potential cell DL throughput takes into consideration buffer requirement, channel conditions but without the subframe restrictions due to subframe of a certain type, i.e. MBSFN vs non-MBSFN.

Action 401-3. For each subframe out of the number of past subframes the network node 110 updates a first unused subframe counter, based on the first current downlink throughput and the first potential downlink throughput. This is to calculate excess subframe.

Action 401-4. For each subframe out of the number of past subframes, the network node 110 computes a first difference (delta1) between the first current downlink throughput and the first potential downlink throughput.

In these embodiments, the first requirement of subframes related to the first RAT is obtained based on the computed delta1 for all the subframes comprised in the number of past subframes. This will be explained more in detail below.

Action 402

Also this action is performed for the MBSFN subframe configuration.

For the number of past subframes, the network node 110 obtains a second requirement of subframes related to the second RAT. The second requirement is based on load and radio conditions related to the second RAT.

The second requirement of subframes related to the second RAT may comprise any one out of increase, decrease, or no change of, the number of subframes related to the second RAT.

In some embodiments, the obtaining of the second requirement of subframes related to the second RAT is performed according to the following actions 402-1, 402-2, and 402-4 and possibly action 402-3.

Action 402-1. For each subframe out of the number of past subframes, the network node 110 calculates a second current downlink throughput based on load and radio conditions and subframe restrictions related to the second RAT.

Action 402-2. For each subframe out of the number of past subframes, the network node 110 calculates a second potential downlink throughput, based on the load and radio conditions related to the second RAT while disregarding subframe restrictions related to the second RAT.

Action 402-3. For each subframe out of the number of past subframes the network node 110 updates a second unused subframe counter, based on the second current downlink throughput and the second potential downlink throughput.

Action 402-4. For each subframe out of the number of past subframes the network node 110 computes a second difference (delta2) between the second current downlink throughput and the second potential downlink throughput.

In these embodiments, the second requirement of subframes related to the second RAT is obtained based on the computed delta2 for all the subframes comprised in the number of past subframes.

Action 403

The network node 110 decides whether or not to change the MBSFN subframe configuration, based on the first requirement of subframes and the second requirement of subframes.

As mentioned above, the first and second requirement of subframes related to the respective first and second RAT may comprise any one out of increase, decrease, or no change of: the number of subframes related to the respective first and second RAT.

In this case, the network node 110 may decide whether or not to change the MBSFN subframe configuration based on the first requirement of subframes and the second requirement of subframes, by deciding to anyone out of: increase, decrease, or no change of, the number of subframes in the MBSFN subframe configuration.

The change of the MBSFN subframe configuration may comprise changing any one or more out of: The number of subframes in the MBSFN subframe configuration as mentioned above, the offset in the MBSFN subframe configuration, and the period of repetition of subframe pattern in the MBSFN subframe configuration.

The embodiments described above will now be further explained and exemplified. The example embodiments described below may be combined with any suitable embodiment above.

The below text relates to Action 401 and Action 402.

The network node 110 may comprise a first RAT scheduler and a second RAT scheduler. For the current MBSFN subframe configuration, each RAT's scheduler in each subframe computes the RAT's current cell DL throughput and the RAT's potential cell DL throughput:

Action 401-1 and Action 402-1. The network node 110 computes the RAT's current downlink throughput, here referred to as current cell DL throughput ($\text{Thput}_{Current}$) based on load and radio conditions and subframe restrictions, such as taking into consideration buffer requirement, channel conditions and subframe restrictions etc. E.g. $\text{Thput}_{Current}$ is filtered with an averaging filter to get $\text{Thput}^{Filter}_{Current}$. This means that the throughput is based on the current subframe and history of previous subframes.

The subframe restriction on LTE, e.g. the second RAT, is that it cannot schedule UEs in DL in MBSFN subframe if they are configured with Transmission modes (TM) mode lower than 9.

The subframe restriction on NR, e.g. the first RAT, is that it cannot achieve maximum throughput in a CRS rate matching subframe due to lesser no. of RE available due to rate matching.

Action 401-2 and Action 402-2. The network node 110 computes the RATs potential downlink throughput, here referred to as the RAT's potential cell DL throughput ($\text{Thput}_{Potential}$) based on load and radio conditions, such as taking into consideration buffer requirement, channel conditions but without the subframe restrictions.

Action 401-3 and Action 402-3. The network node 110 may update a first and second unused subframe counter, based on the respective first and second current downlink throughput and the respective first and second potential downlink throughput. For example, if a buffer requirement of all UEs 121, 122 in current subframe is zero, an unused subframe counter is incremented (Unused$_{subframes}$). Thput$_{Potential}$ and Thput$_{Current}$ will be 0 for such subframe. This means that such a subframe was not needed by the RAT in question Action 401-4 and Action 402-4. The network node 110 then computes a respective first and second difference, delta1 and delta2, between the respective first and second current downlink throughput and the first and second potential downlink throughput. The network node 110 e.g. computes delta throughput by using the formula: Thput$_{Delta}$=Thput$_{potential}$−Thput$_{Current}$.

This delta throughput may be filtered with averaging filter by using the formula: Thput$^{Filter}_{Delta}$=filter(Thput$_{Delta}$). This means that the throughput difference is based on the current and the history of previous subframes. This is done to take long term correct decision for any configuration changes.

At the end of each configuration update period, i.e. comprising the period the number of past subframes as mentioned above, the network node 110 may for each first and second RAT, e.g. by means of its compute the respective first and second RAT suggested subframe configuration by computing the number of subframes to increase or decrease by using the formula: Needed Subframes= CEIL(Thput$^{Filter}_{Current}$/Thput$^{Filter}_{Delta}$)−Unused$_{subframes}$. See explanation for Table 2 example.

A negative value represents decrease, a positive value represents increase. See Table 2 and Table 3 below.

deficiency of subframes. A value greater than 1 represents deficiency and a value less than 1 represents surplus. This ratio is compensated by the unused subframes in measurement period to calculate the additional subframes needed. In this example, the ratio of 30/40<1, ceiling it upwards to 1 and reducing the 2 unused subframes from this gives −1, meaning that this RAT needs one lesser scheduling subframe than the current configuration.

|           |     | MBSFN | MBSFN |     | MBSFN |     | MBSFN | MBSFN |     | MBSFN | Total of 10 |
|-----------|-----|-------|-------|-----|-------|-----|-------|-------|-----|-------|-------------|
| Potential | 100 | 100   | 100   | 100 | 100   | 100 | 100   | 100   | 100 | 100   | 100         |
| Current   | 0   | 100   | 100   | 0   | 100   | 0   | 100   | 100   | 0   | 100   | 60          |
| Delta     | 100 | 0     | 0     | 100 | 0     | 100 | 0     | 0     | 100 | 0     | 40          |
| Unused    | 0   | 0     | 0     | 0   | 0     | 0   | 0     | 0     | 0   | 0     | 0           |
| Needed    |     |       |       |     |       |     |       |       |     |       | 1           |

Table 3 illustrates an example of an increasing subframe.

In Table 3, represents an example when buffer requirement is non-zero in all 10 subframes of measurement period is 10 subframes. The row marked Potential represents opportunity to schedule which is in every subframe. The average of potential throughput over 10 subframes where buffer was non-zero thus is 1000/10=100. The row marked Current represents throughput utilized as a result of MBSFN subframe configuration. This RAT can only use MBSFN subframes. The average of current throughput over 10 potential usable subframes out of 10 is 600/10=60. The row marked Delta is the difference between Potential and Current throughputs. The average difference over measurement period of 10 subframes is 400/10=40. The unused subframes out of 10 in this example is 0 meaning every subframe could potentially be scheduled. In this example, the ratio of 40/60<1, however, ceiling it upwards and compensating for unused subframes gives 1, meaning that this RAT needs one additional scheduling subframe than the current configuration.

|           | MBSFN | MBSFN |     | MBSFN |     | MBSFN | MBSFN |   |   | MBSFN | Total of 10 |
|-----------|-------|-------|-----|-------|-----|-------|-------|---|---|-------|-------------|
| Potential | 100   | 100   | 100 | 100   | 100 | 0     | 0     | 0 | 0 | 0     | 100         |
| Current   | 100   | 0     | 0   | 100   | 0   | 0     | 0     | 0 | 0 | 0     | 40          |
| Delta     | 0     | 100   | 100 | 0     | 100 | 0     | 0     | 0 | 0 | 0     | 30          |
| Unused    | 0     | 0     | 0   | 0     | 0   | 1     | 0     | 0 | 2 | 0     | 2           |
| Needed    |       |       |     |       |     |       |       |   |   |       | −1          |

Table 2 illustrates an example of a decreasing subframe.

In Table 2, represents an example when buffer requirement is non-zero in the first 5 subframes and measurement period is 10 subframes. The row marked Potential represents opportunity to schedule which is in first 5 subframes out of 10. The average of potential throughput over 5 subframes where buffer was non-zero thus is 500/5=100. The row marked Current represents throughput utilized as a result of MBSFN subframe configuration. This RAT can only use non-MBSFN subframes and had non-zero buffer in first 5 subframes. The average of current throughput over 5 potential usable subframes out of 10 is 200/5=40. The row marked Delta is the difference between Potential and Current throughputs. The average difference over measurement period of 10 subframes is 300/10=30. The unused subframes out of 10 in this example is 2 where scheduling was possible, but buffer requirement was 0. The ratio of average difference to average utilized throughput represents the surplus or The below text relates to Action 403.

The subframe configuration may be passed to a shared resource allocator which compares each of the first and second RAT's subframe suggestion.

Based on the suggestions, the network node 110 such as its shared resource allocator decides whether or not to change the MBSFN subframe configuration by e.g. taking one of the following decisions:

Increase the number of MBSFN subframes in the MBSFN subframe configuration.

Decrease the number of MBSFN subframes in the MBSFN subframe configuration.

Do not change the number of MBSFN subframes in the MBSFN subframe configuration.

There are multiple policies which may influence this decision, such as RAT preference, QoS considerations etc. A simple decision table such as Table 4, may be used to change the subframe configuration:

| LTE's MBSFN suggestion | NR's MBSFN suggestion | Decision |
|---|---|---|
| Increase | Increase | Increase |
| Increase | Decrease | No change |
| Decrease | Increase | No change |
| Decrease | Decrease | Decrease |

Table 4 illustrates suggestions and decision of increasing, decreasing or no change in the number of MBSFN subframes in the MBSFN subframe configuration.

Figure 5:
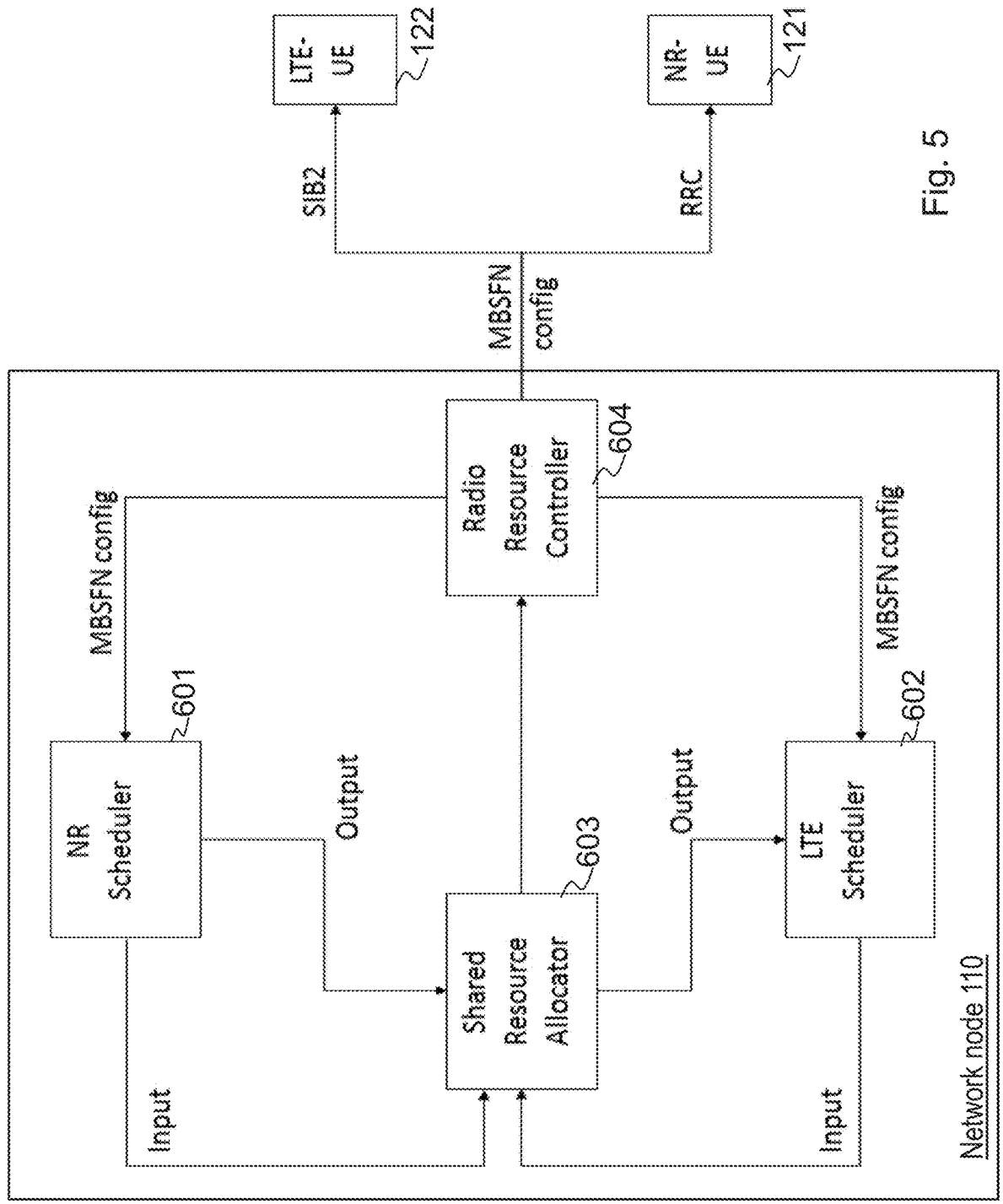
FIG. 5 is a schematic block diagram depicting embodiments of a wireless communication network.

FIG. 5 is a block diagram depicting an arrangement of the network node 110 and the UE 121 represented by an NR UE and the UE 122 represented by an LTE UE, according to an example of embodiments herein. The network node 110 may comprise a first RAT scheduler 601, e.g. an NR scheduler and a second RAT scheduler 602, e.g. an LTE scheduler. The network node 110 may further comprise a shared resource allocator 603 for allocating resource blocks for each transmission according to embodiments herein, and a radio resource controller 604.

The MBSFN subframe configuration may vary between a minimum numbers of MBSFN subframes needed for LTE such as the second RAT and NR such as the first RAT coexistence to a maximum number of MBSFN subframes allowed in 3GPP.

At each update period, e.g. comprising the number of past subframes mentioned above, the MBSFN subframe configuration decision may be passed to the Radio Resource Control (RRC) layer, e.g. the radio resource controller 604 and the respective first RAT scheduler 601 and second RAT scheduler 602.

The radio resource controller 604 may update the SIB2 information. SIB2 information is System Information Block Type 2 which carries MBSFN subframe configuration information in LTE. SIB2 contains common and shared channel information used in the cell. This includes configuration information on the RA channel, shared uplink control channels, and the paging channel.

Each RAT UE 121, 122 starts to use the MBSFN subframe configuration based on the update information.

Figure 6:
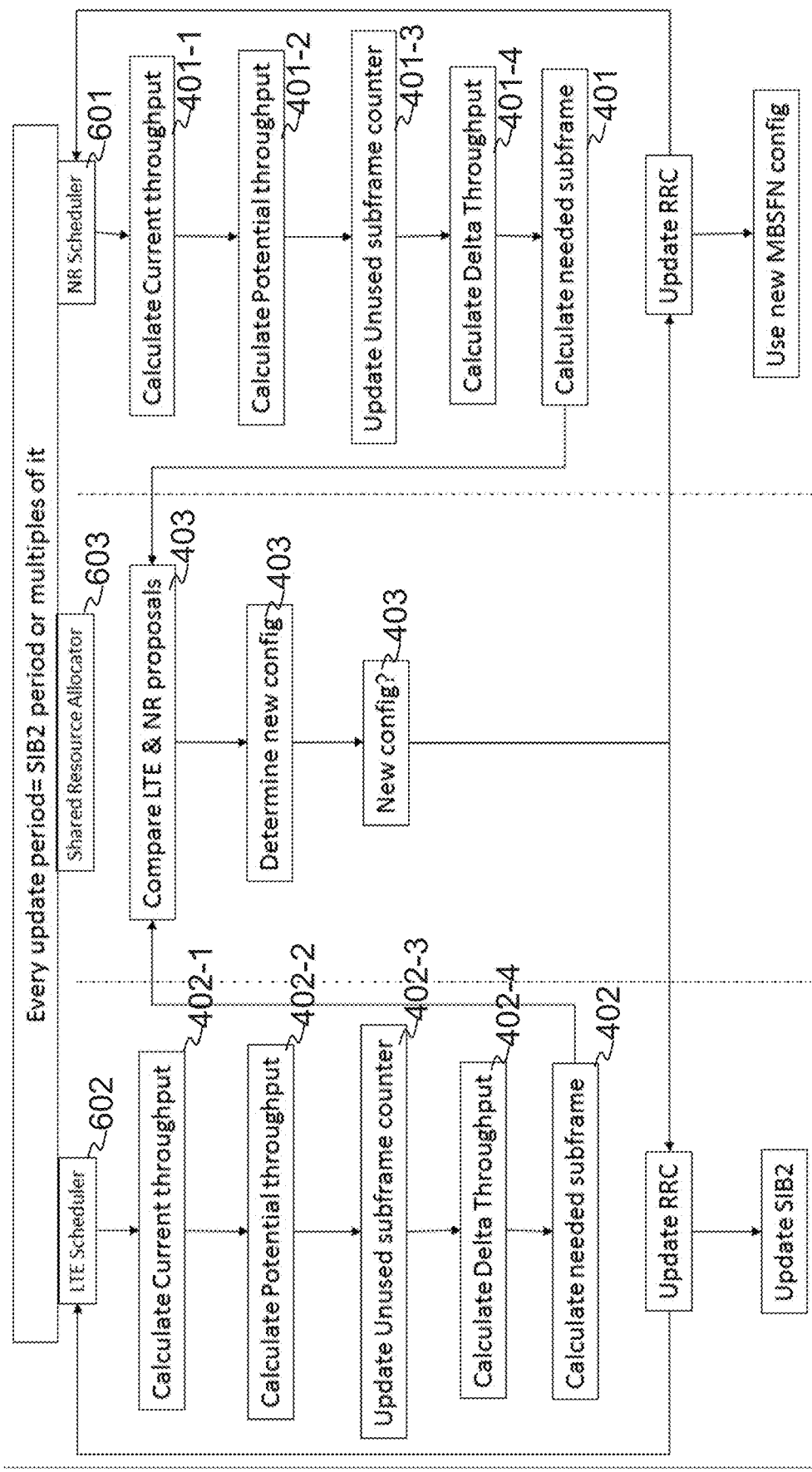
FIG. 6 is a flow chart depicting embodiments of a method in a network node.

FIG. 6 is a flow diagram depicting an example of the method during an update period according to embodiments herein. The decision whether to change the MBSFN subframe configuration is performed e.g. after every update period. The update period comprises a number of subframes that shall be evaluated to serve as the basis of the decision, these are referred to as "the number of past subframes" above. The update period may preferably be an SIB2 period or multiples of it. A SIB2 period is a period after which the SIB2 is transmitted. The number of past subframes may e.g. be siPeriodicitySI2=64 {8, 16, 32, 64, 128, 256, 512} radio frame.

The following actions are performed as also has been described above using the same reference numbers.

In the first RAT Scheduler 601 of the network node 110, in this example an NR Scheduler, the following actions are performed for the update period:

The current throughput is calculated 401-1 for each subframe out of the number of past subframes. The potential throughput is calculated 401-2 for each subframe out of the number of past subframes. The unused subframe counter is updated 401-3 for each subframe out of the number of past subframes. The delta throughput, delta1, is calculated 401-4 for each subframe out of the number of past subframes. The needed subframes are calculated 401 for the number of past subframes, this comprises the update period. The needed first RAT, such as NR, subframes are referred to as the first requirement of subframes. The calculated needed subframes such as the first requirement of subframes are transferred to the shared resource allocator 603 as a proposal.

In the second RAT Scheduler 602 of the network node 110, such as in this example an LTE Scheduler, the following actions are performed for the update period:

The current throughput is calculated 402-1 for each subframe out of the number of past subframes. The potential throughput is calculated 402-2 for each subframe out of the number of past subframes. The unused subframe counter is updated 402-3 for each subframe out of the number of past subframes. The delta throughput, delta1, is calculated 402-4 for each subframe out of the number of past subframes. The needed subframes are calculated 402 for the number of past subframes, this comprises the update period. The needed second RAT subframes, such as LTE subframes, are referred to as the second requirement of subframes herein. The calculated needed LTE subframes such as the second requirement of subframes are transferred to the shared resource allocator 603 as a proposal.

In the shared resource allocator 603, the following actions are performed for the update period.

The first and second requirements of subframes are compared. E.g., the NR and LTE proposals are compared. Whether or not to change the MBSFN subframe configuration, is then decided based on the compared first and second requirements of subframes. This relates to Action 403.

If decided to change the MBSFN subframe configuration, a new, updated MBSFN subframe configuration is determined, e.g. by using Table 4 as described above.

If a new MBSFN subframe configuration is determined, the updated MBSFN subframe configuration is transferred to RRC in respective first and second RAT Scheduler 601, 602 of the network node 110, such as the NR Scheduler and the LTE scheduler. Then the SIB2 is updated, which means that the shared spectrum system will use a new MBSFN subframe configuration The new MBSFN subframe configuration is then ready to be used.

Figure 7:
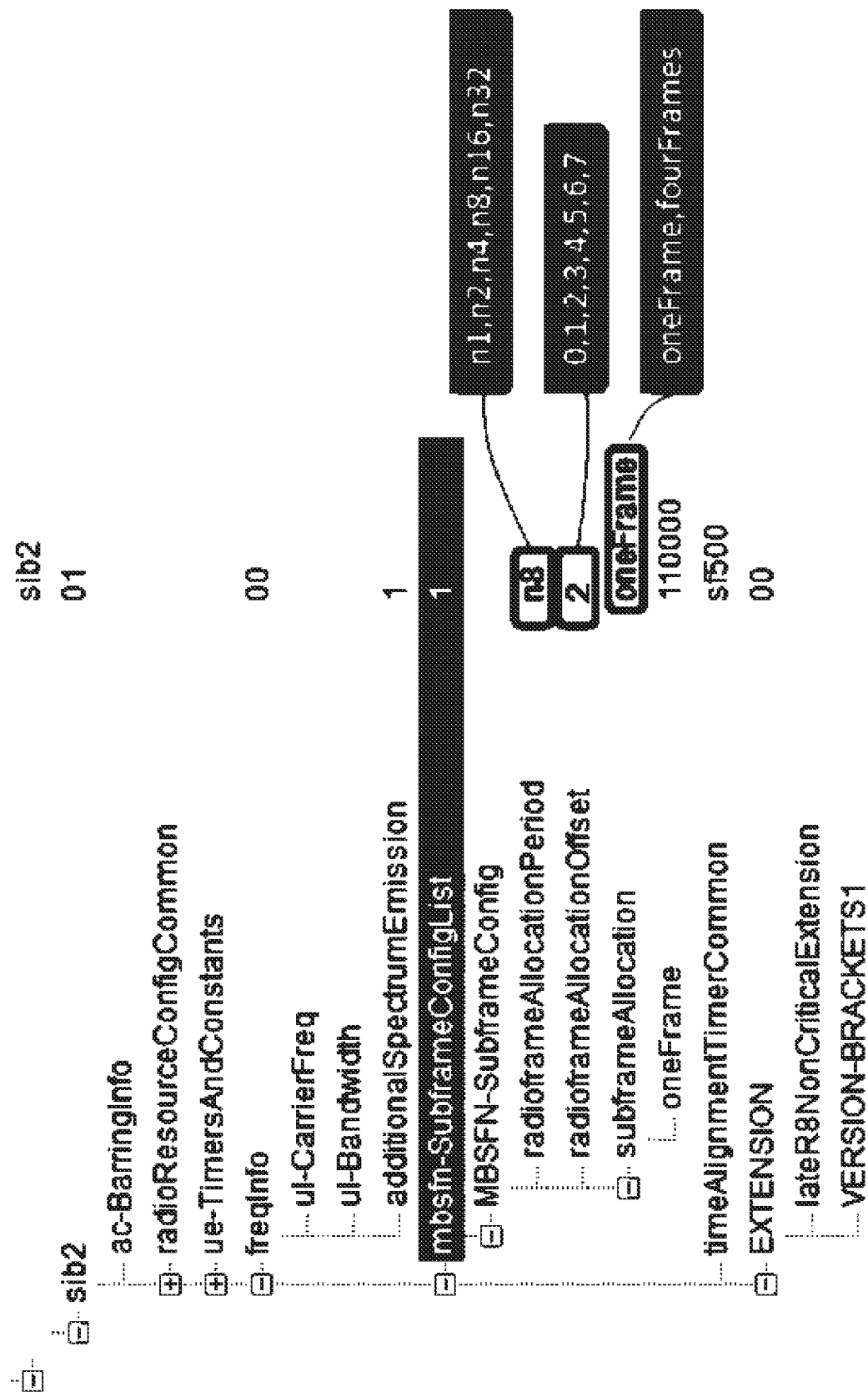
FIG. 7 is a schematic diagram depicting an example embodiment.
Figure 8:
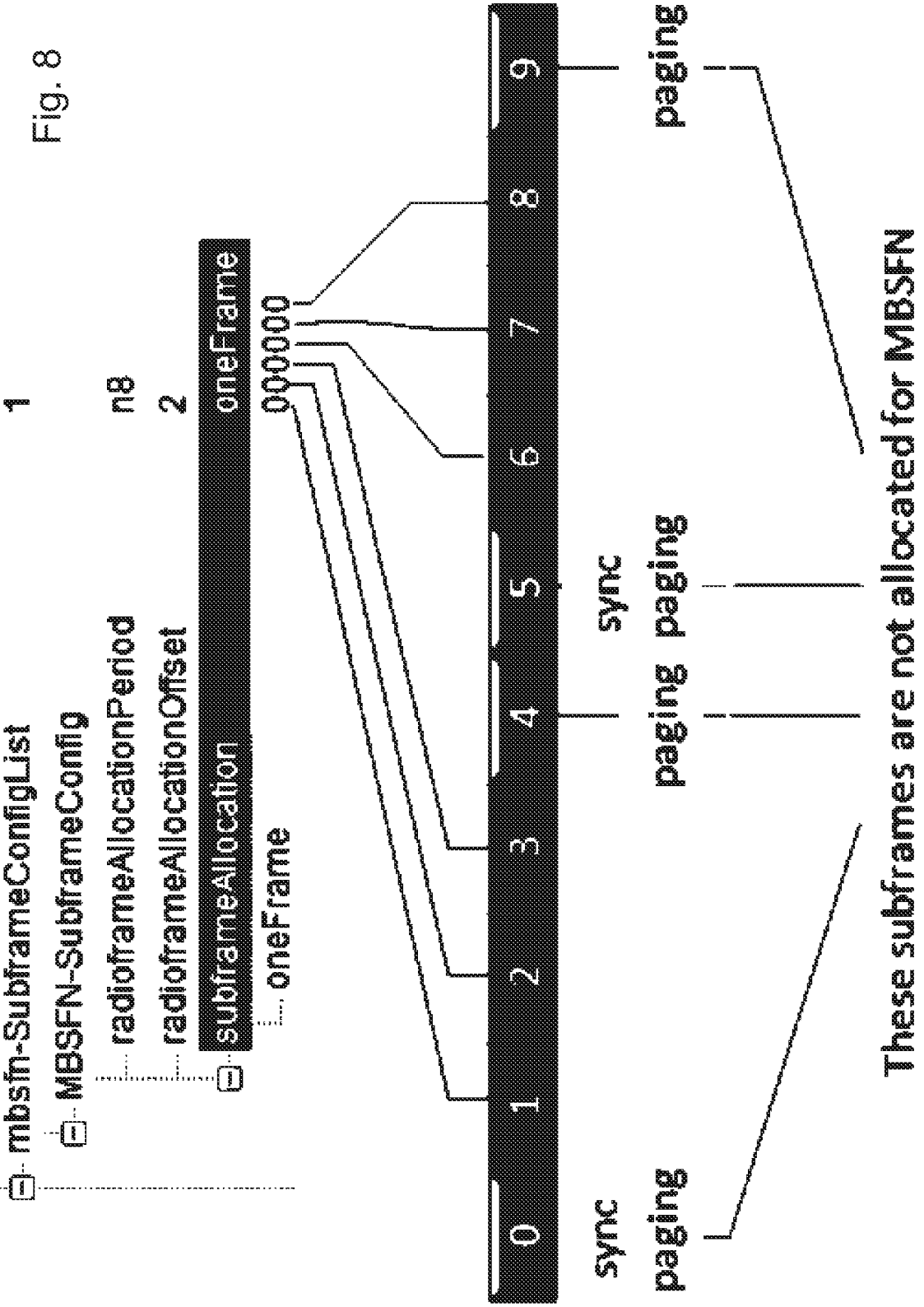
FIG. 8 is a schematic diagram depicting an example embodiment.

FIG. 7 depicts how an LTE MBSFN Configuration is transmitted in SIB2 message FIG. 8 depicts an MBSFN Subframe Allocation showing which subframes are allocated for MBSFN and which are normal subframes.

Figure 9A:
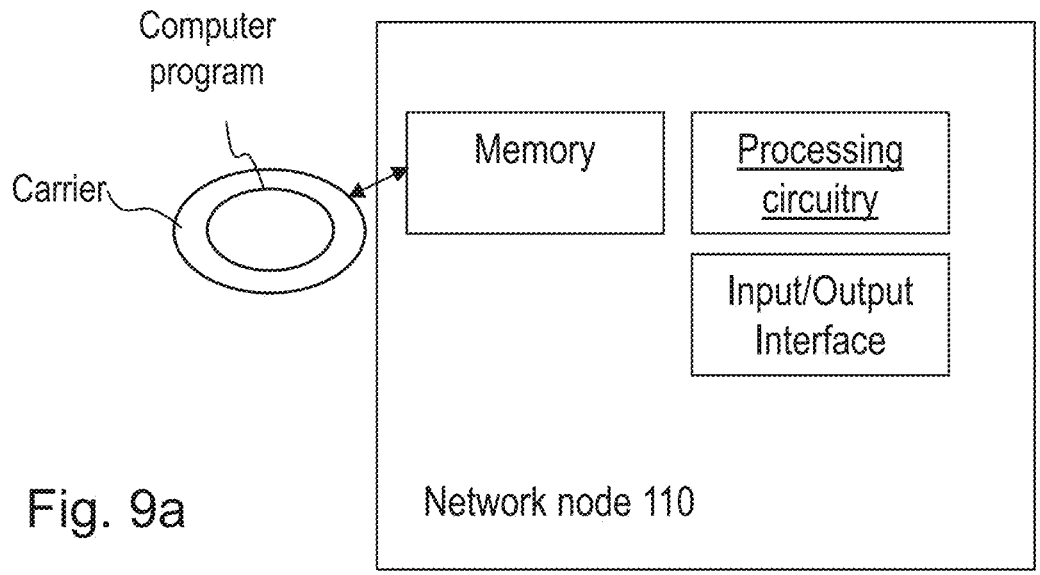
FIGS. 9 *a* and *b* are schematic block diagrams depicting embodiments of a network node.
Figure 9B:
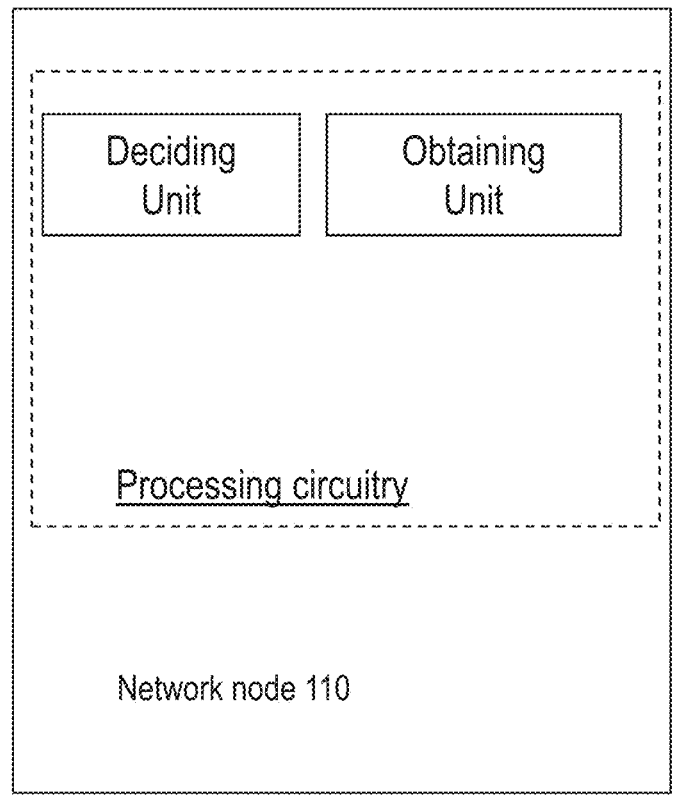

To perform the action as mentioned above, the network node 110 may comprise the arrangement as shown in FIGS. 9 *a* and *b*.

The network node 110 may comprise a respective input and output interface configured to communicate with the UEs 121, 122 see FIG. 10*a*. The input and output interface may comprise a wireless receiver (not shown) and a wireless transmitter (not shown).

The network node 110 is configured to handle a MBSFN subframe configuration in the wireless communications network 100. The MBSFN subframe configuration is adapted to be configured for the first RAT e.g. NR, for operating in shared spectrum mode with a second RAT, e.g. LTE, for radio communication with the one or more UEs 121, 122. The MBSFN subframe configuration is adapted to be configured with a second RAT CRS rate matching.

The first RAT may be adapted to be represented by Fifth Generation New Radio, 5G NR, and the second RAT is adapted to be represented by Fourth Generation Long Term Evolution, 4G LTE, and/or the first RAT may be adapted to be represented by 4G LTE and the second RAT is adapted to be represented by 5G NR.

The network node 110 is further configured to, for the MBSFN subframe configuration, e.g. by means of an obtaining unit in the network node 110:
for a number of past subframes, obtain a first requirement of subframes related to the first RAT, which first requirement is adapted to be based on load and radio conditions related to the first RAT, and
for the number of past subframes, obtain a second requirement of subframes related to the second RAT, which second requirement is adapted to be based on load and radio conditions related to the second RAT.

In some embodiments, the network node 110 is further configured to, e.g. by means of an obtaining unit in the network node 110, obtain the first requirement of subframes related to the first RAT by for each subframe out of the number of past subframes:
Calculating a first current downlink throughput, based on load and radio conditions and subframe restrictions related to the first RAT,
calculating a first potential downlink throughput, based on the load and radio conditions related to the first RAT while disregarding subframe restrictions related to the first RAT, and
computing a first difference, delta1, between the first current downlink throughput and the first potential downlink throughput.

In these embodiments, the first requirement of subframes related to the first RAT is adapted to be obtained based on the computed delta1 for all the subframes comprised in the number of past subframes.

In some embodiments, the network node 110 is further configured to, e.g. by means of an obtaining unit in the network node 110, to obtain the second requirement of subframes related to the second RAT by for each subframe out of the number of past subframes:
Calculating a second current downlink throughput, based on load and radio conditions and subframe restrictions related to the second RAT,
calculating a second potential downlink throughput, based on the load and radio conditions related to the second RAT while disregarding subframe restrictions related to the second RAT, and
computing a second difference, delta2, between the second current downlink throughput and the second potential downlink throughput.

In these embodiments, the second requirement of subframes related to the second RAT may be adapted to be obtained based on the computed delta2 for all the subframes comprised in the number of past subframes.

The network node 110 may further be configured to, e.g. by means of the obtaining unit in the network node 110, obtain the first requirement of subframes related to the first RAT by further, for each subframe out of the number of past subframes, updating a first unused subframe counter, based on the first current downlink throughput and the first potential downlink throughput, and obtain the second requirement of subframes related to the second RAT by further, for each subframe out of the number of past subframes updating a second unused subframe counter, based on the second current downlink throughput and the second potential downlink throughput.

The network node 110 is further configured to, e.g. by means of a deciding unit in the network node 110, decide whether or not to change the MBSFN subframe configuration based on the first requirement of subframes and the second requirement of subframes.

In some embodiments, the first requirement of subframes related to the first RAT is adapted to comprise any one out of increase, decrease, or no change of: the number of subframes related to the first RAT, and the second requirement of subframes related to the second RAT is adapted to comprise any one out of increase, decrease, or no change of: the number of subframes related to the second RAT.

In these embodiments, the network node 110 is further configured to decide whether or not to change the MBSFN subframe configuration based on the first requirement of subframes and the second requirement of subframes, by deciding to anyone out of: increase, decrease, or no change of: the number of subframes in the MBSFN subframe configuration.

The change of the MBSFN subframe configuration may be adapted to comprise a change of any one or more out of: The number of subframes in the MBSFN subframe configuration, the offset in the MBSFN subframe configuration, and the period of repetition of subframe pattern in the MBSFN subframe configuration.

Figure 10:
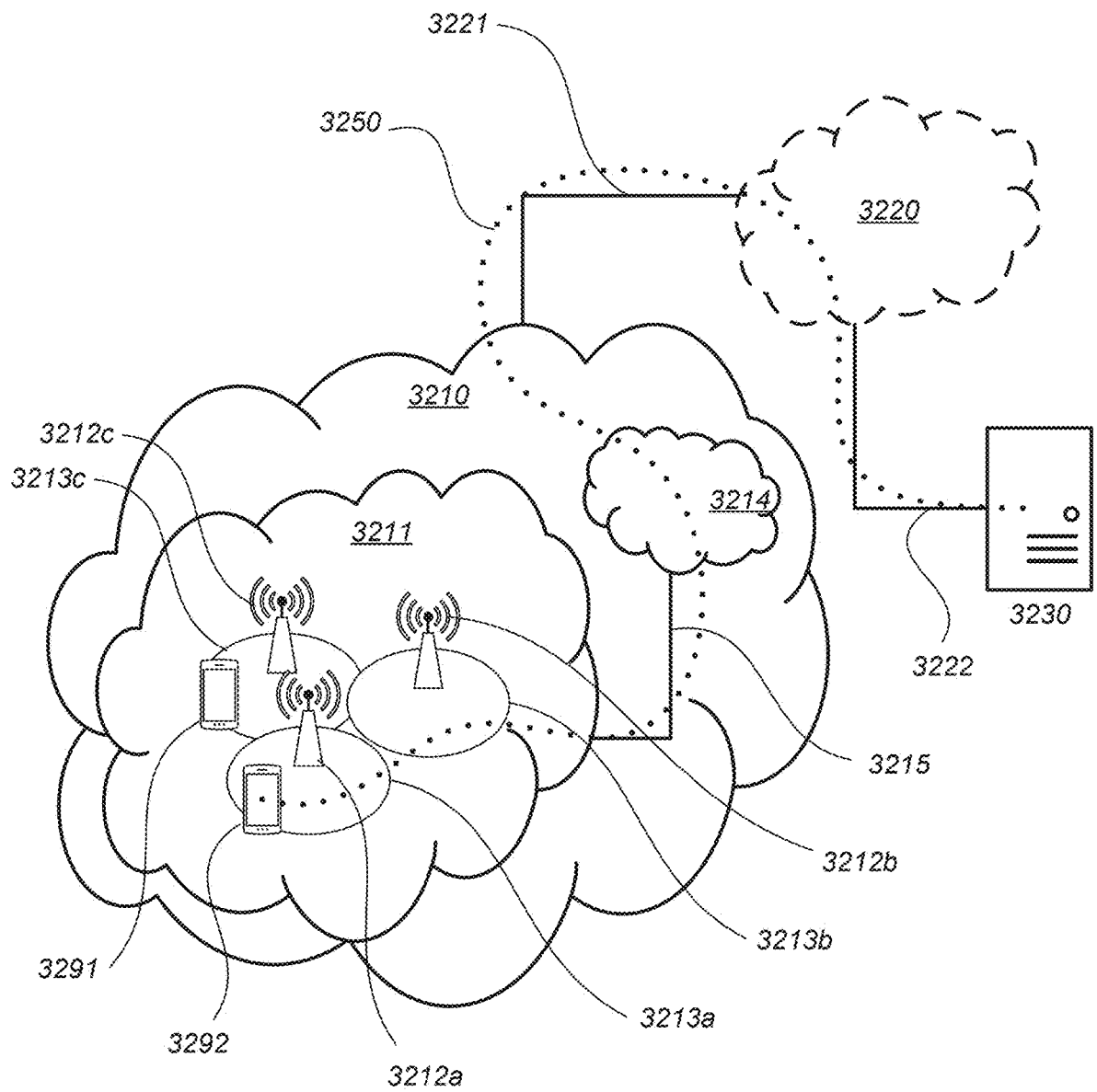
FIG. 10 schematically illustrates a telecommunication network connected via an intermediate network to a host computer.

The embodiments herein may be implemented through a respective processor or one or more processors, such as the respective processor of a processing circuitry in the network node 110, depicted in FIGS. 10 a and b, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a respective memory comprising one or more memory units. Each memory comprises instructions executable by the processor in the network node 110.

Each respective memory is arranged to be used to store requirements, evaluations, information, data, configurations, and applications to perform the methods herein when being executed in the network node 110.

In some embodiments, a respective computer program comprises instructions, which when executed by the at least one processor, cause the at least one processor of the network node 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 110, that when executed by the respective one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

FURTHER EXTENSIONS AND VARIATIONS

Figure 11:
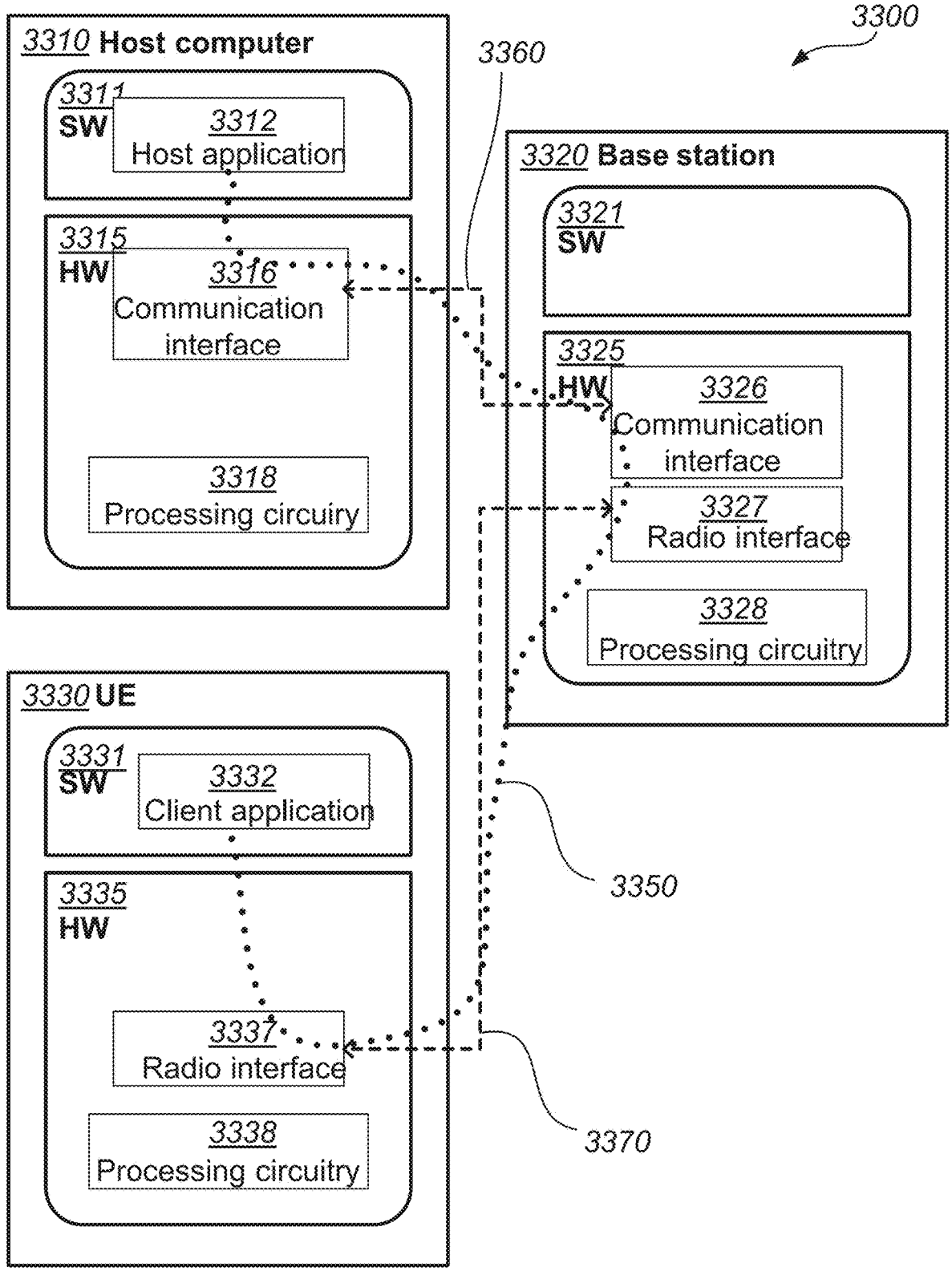
FIG. 11 is a generalized block diagram of a host computer communicating via a base station with a user equipment over a partially wireless connection.

With reference to FIG. 11, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 13, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station such as the network node 110, and a UE such as the UE 120, which may be those described with reference to FIG. 11 and FIG. 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a network node for handling a Multicast-Broadcast Single-Frequency Network (MBSFN) subframe configuration for sharing spectrum between a first radio access technology (RAT) and a second RAT in a wireless communications network, wherein the MBSFN subframe configuration is arranged for rate matching by the first RAT due to second RAT cell-specific reference signal (CRS) transmissions, wherein the method comprises:
    obtaining a first requirement of subframes related to the first RAT, based on load and radio conditions related to the first RAT during a number of past subframes, wherein the first requirement of subframes related to the first RAT comprises one of the following actions in relation to a number of subframes related to the first RAT during the number of past subframes: increase, decrease, or no change;
    obtaining a second requirement of subframes related to the second RAT, based on load and radio conditions related to the second RAT during the number of past subframes, wherein the second requirement of subframes related to the second RAT comprises one of the following actions in relation to a number of subframes related to the second RAT during the number of past subframes: increase, decrease, or no change; and
    deciding whether to increase, decrease, or make no change to a number of MBSFN subframes in the MBSFN subframe configuration, based on the first requirement and the second requirement.

2. The method according to claim 1, further comprising deciding whether to change one or more of the following based on the first requirement and the second requirement:
    an offset in the MBSFN subframe configuration, and
    a period of repetition of subframe pattern in the MBSFN subframe configuration.

3. The method according to claim 1, wherein obtaining the first requirement of subframes related to the first RAT comprises:
    for each subframe of the number of past subframes:
        calculating a first current downlink throughput, based on load and radio conditions and subframe restrictions related to the first RAT;
        calculating a first potential downlink throughput, based on the load and radio conditions related to the first RAT while disregarding subframe restrictions related to the first RAT; and
        computing a first difference, delta1, between the first current downlink throughput and the first potential downlink throughput; and
    obtaining the first requirement of subframes related to the first RAT based on the computed delta1 for all subframes of the number of past subframes.

4. The method according to claim 3, wherein obtaining the first requirement of subframes related to the first RAT further comprises, for each subframe of the number of past subframes, updating a first unused subframe counter based on the first current downlink throughput and the first potential downlink throughput.

5. The method according to claim 1, wherein obtaining the second requirement of subframes related to the second RAT comprises:
    for each subframe of the number of past subframes:
        calculating a second current downlink throughput, based on load and radio conditions and subframe restrictions related to the second RAT;
        calculating a second potential downlink throughput, based on the load and radio conditions related to the second RAT while disregarding subframe restrictions related to the second RAT; and
        computing a second difference, delta2, between the second current downlink throughput and the second potential downlink throughput; and
    obtaining the second requirement of subframes related to the second RAT based on the computed delta2 for all subframes of the number of past subframes.

6. The method according to claim 5, wherein obtaining the second requirement of subframes related to the second RAT further comprises, for each subframe of the number of past subframes, updating a second unused subframe counter based on the second current downlink throughput and the second potential downlink throughput.

7. The method according to claim 1, wherein one of the following applies:
    the first RAT is Fifth Generation New Radio (5G NR) and the second RAT is Fourth Generation Long Term Evolution (4G LTE); or
    the first RAT is 4G LTE and the second RAT is 5G NR.

8. A network node arranged to handle a Multicast-Broadcast Single-Frequency Network (MBSFN) subframe configuration for sharing spectrum between a first radio access technology (RAT) and a second RAT in a wireless communications network, wherein the MBSFN subframe configuration is arranged for rate matching by the first RAT due to second RAT cell-specific reference signal (CRS) transmissions, the network node comprising processing circuitry arranged to execute program code, whereby the network node is configured to:
    obtain a first requirement of subframes related to the first RAT, based on load and radio conditions related to the first RAT during a number of past subframes, wherein the first requirement of subframes related to the first RAT comprises one of the following actions in relation to a number of subframes related to the first RAT during the number of past subframes: increase, decrease, or no change;
    obtain a second requirement of subframes related to the second RAT, based on load and radio conditions related to the second RAT during the number of past subframes, wherein the second requirement of subframes related to the second RAT comprises one of the following actions in relation to a number of subframes related to the second RAT during the number of past subframes: increase, decrease, or no change; and
    decide whether to increase, decrease, or make no change to a number of MBSFN subframes in the MBSFN subframe configuration, based on the first requirement and the second requirement.

9. The network node according to claim 8, wherein execution of the program code by the processing circuitry configures the network node to decide whether to change one or more of the following, based on the first requirement and the second requirement:
an offset in the MBSFN subframe configuration, and
a period of repetition of subframe pattern in the MBSFN subframe configuration.

10. The network node according to claim 8, wherein execution of the program code by the processing circuitry configures the network node to obtain the first requirement of subframes related to the first RAT based on:
for each subframe of the number of past subframes:
calculating a first current downlink throughput, based on load and radio conditions and subframe restrictions related to the first RAT;
calculating a first potential downlink throughput, based on the load and radio conditions related to the first RAT while disregarding subframe restrictions related to the first RAT; and
computing a first difference, delta1, between the first current downlink throughput and the first potential downlink throughput; and
obtaining the first requirement of subframes related to the first RAT based on the computed delta1 for all subframes of the number of past subframes.

11. The method according to claim 10, wherein execution of the program code by the processing circuitry configures the network node to obtain the first requirement of subframes related to the first RAT further based on, for each subframe of the number of past subframes, updating a first unused subframe counter based on the first current downlink throughput and the first potential downlink throughput.

12. The network node according to claim 8, wherein execution of the program code by the processing circuitry configures the network node to obtain the second requirement of subframes related to the second RAT based on:
for each subframe of the number of past subframes:
calculating a second current downlink throughput, based on load and radio conditions and subframe restrictions related to the second RAT;
calculating a second potential downlink throughput, based on the load and radio conditions related to the second RAT while disregarding subframe restrictions related to the second RAT; and
computing a second difference, delta2, between the second current downlink throughput and the second potential downlink throughput; and
obtaining the second requirement of subframes related to the second RAT based on the computed delta2 for all subframes of the number of past subframes.

13. The method according to claim 12, wherein execution of the program code by the processing circuitry configures the network node to obtain the second requirement of subframes related to the second RAT further based on, for each subframe of the number of past subframes, updating a second unused subframe counter based on the second current downlink throughput and the second potential downlink throughput.

14. The network node according to claim 8, wherein one of the following applies:
the first RAT is Fifth Generation New Radio (5G NR) and the second RAT is Fourth Generation Long Term Evolution (4G LTE); or
the first RAT is 4G LTE and the second RAT is 5G NR.

* * * * *